(No Model.)
J. SPENCE.
CORN HUSKER.
No. 382,568. Patented May 8, 1888.
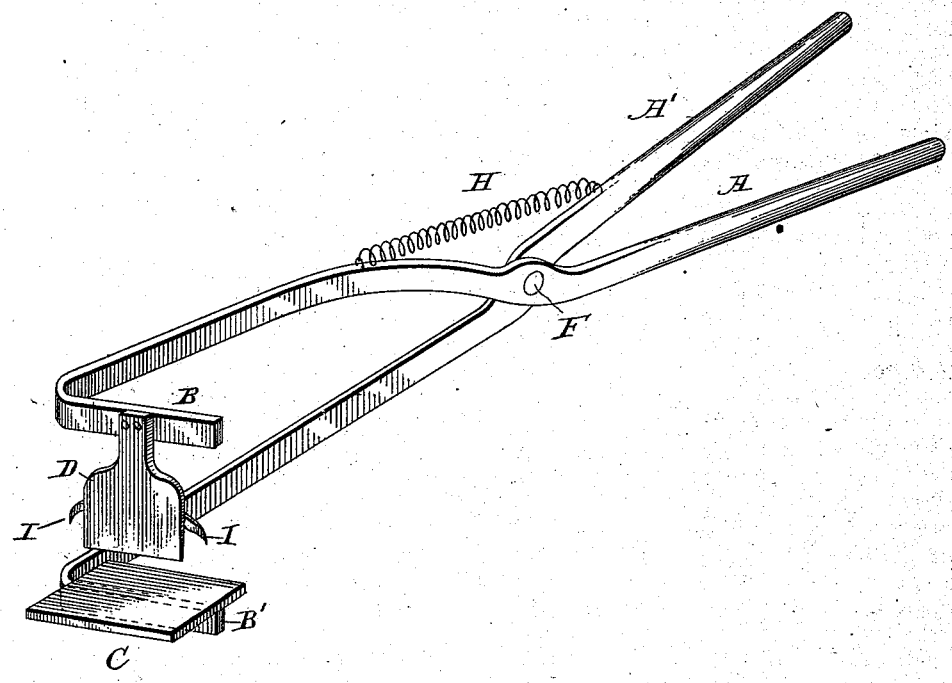
Joseph Spence,
Inventor.
Witnesses:
Harvey Morrison.
J. E. Spence.

UNITED STATES PATENT OFFICE.

JOSEPH SPENCE, OF NEAR NEW LISBON, OHIO, ASSIGNOR TO LYDIA A. SPENCE, OF SAME PLACE.

CORN-HUSKER.

SPECIFICATION forming part of Letters Patent No. 382,568, dated May 8, 1888.

Application filed October 12, 1885. Serial No. 179,719. (No model.)

*To all whom it may concern:*

Be it known that I, JOSEPH SPENCE, a citizen of the United States, residing near New Lisbon, in the county of Columbiana and State of Ohio, have invented certain new and useful Improvements in Corn-Husking Implements; and I do hereby declare the following to be a full, clear, and exact description of the invention, such as will enable others skilled in the art to which it appertains to make and use the same.

This invention relates to corn-husking implements; and it has for its object to provide a simple, durable, and inexpensive implement which will effectively cut the ear of corn from its husk or stalk with little exertion on the part of the operator; and it consists of the parts and combinations of parts hereinafter described and claimed.

In the accompanying drawing, forming a part of this specification, the figure represents a perspective view of my improved implement.

A A' represent the handles or levers of my implement, which are pivoted at a suitable distance from their ends by a pin, F. From their pivoted point they are bent away from each other, as clearly shown in the drawing, the handle or lever A being given a greater curve than the handle A', the latter being straight from a point slightly in advance of the pin F. The handles or levers are both bent at their ends at right angles to form lateral extensions B B'. The extension B has riveted or otherwise secured to it a cutting-blade, D, having on each side thereof a curved projection, I, while the extension B' has secured to its edge, adjacent to extension B, a platform, C, of sufficient width and length for the butt-end of an ear of corn to be laid thereon.

H represents a spiral spring, one end of which is secured to the handle or lever A' on one side of the pivotal point and the other end to the handle or lever A on the other side of the pivotal point, for the purpose of holding the two levers normally apart.

In operating the implement the handles are grasped by the right hand, and the butt-end of an ear of corn, which is held by the left hand, is laid on the platform C, the ear extending backward or toward the operator, with the stalk at its point of attachment to the ear immediately beneath the blade D. The handles are then brought toward each other, thus bringing the blade down and cutting the stalk from the ear, when, if the ear is well matured and the husk open at the point, the ear may be easily drawn out from its husk; but if the ear is close-husked at the point the cutting-edge of the implement is brought toward the operator and the ear drawn from its husk at the butt-end, which is exposed, while the husk is held between the blade and platform, as the blade does not cut clear through the husk. The projections I are intended to press down the husk and better open the end of the ear.

Having thus described my invention, what I claim as new, and desire to secure by Letters Patent, is—

An implement for husking corn, consisting of the pivoted handles or levers A A', curving away from each other from their pivotal point, and having the lateral extensions B B', the cutting-blade D, provided with the curved projections I, the platform C, and the spring H, having its ends secured to the levers A and A', respectively, substantially as and for the purpose set forth.

JOSEPH SPENCE.

Witnesses:
H. MORRISON,
H. C. SPENCE.